US011076527B2

(12) United States Patent
Van Beek

(10) Patent No.: US 11,076,527 B2
(45) Date of Patent: Aug. 3, 2021

(54) FOLIAGE-PROCESSING DEVICE AND HARVESTING MACHINE COMPRISING SUCH A FOLIAGE-PROCESSING DEVICE

(71) Applicant: Ploeger Oxbo Europe B.V., Roosendaal (NL)

(72) Inventor: Cornelius Johannes Maria Van Beek, Roosendaal (NL)

(73) Assignee: Ploeger Oxbo Europe B.V., Roosendaal (NL)

(*) Notice: Subject to any disclaimer, the term of this patent is extended or adjusted under 35 U.S.C. 154(b) by 290 days.

(21) Appl. No.: 16/316,562

(22) PCT Filed: Jul. 13, 2017

(86) PCT No.: PCT/NL2017/050475
§ 371 (c)(1),
(2) Date: Jan. 9, 2019

(87) PCT Pub. No.: WO2018/012975
PCT Pub. Date: Jan. 18, 2018

(65) Prior Publication Data
US 2019/0216010 A1    Jul. 18, 2019

(30) Foreign Application Priority Data
Jul. 15, 2016 (NL) .................................. 2017172

(51) Int. Cl.
*A01D 33/02* (2006.01)
*A01D 33/06* (2006.01)

(52) U.S. Cl.
CPC ............ *A01D 33/02* (2013.01); *A01D 33/06* (2013.01)

(58) Field of Classification Search
CPC ................................ A01D 33/02; A01D 33/06

USPC .................................. 172/27, 28, 30, 41, 42
See application file for complete search history.

(56) References Cited

U.S. PATENT DOCUMENTS 4,135,580 A * 1/1979 Bouwman .............. A01D 33/06
171/6

FOREIGN PATENT DOCUMENTS

| EP | 2 050 325 A1 | 4/2009 |
|----|--------------|--------|
| NL | 99 872 C     | 7/1961 |
| NL | 7 011 052 A  | 1/1972 |
| NL | 7 905 829 A  | 1/1981 |

OTHER PUBLICATIONS

International Search Report in International Patent Application No. PCT/NL2017/050475, dated Nov. 9, 2017 (5 pages).
Written Opinion in International Patent Application No. PCT/NL2017/050475, dated Nov. 9, 2017 (6 pages).

* cited by examiner

Primary Examiner — Tara Mayo-Pinnock
(74) Attorney, Agent, or Firm — Nixon Peabody LLP

(57) ABSTRACT

The invention relates to a foliage-processing device which can be moved across agricultural land in a direction of travel for foliage of tuberous plants growing in rows on agricultural land, wherein the foliage-processing device is provided with:
- a foliage puller which is provided with at least two mutually oppositely rotating rollers between which foliage can be clamped and pulled off;
- a foliage-processing mechanism by means of which the foliage pulled off by means of the foliage puller can be removed next to a row or between the rows of tuberous plants growing on the agricultural land.

17 Claims, 5 Drawing Sheets

Figure 1:
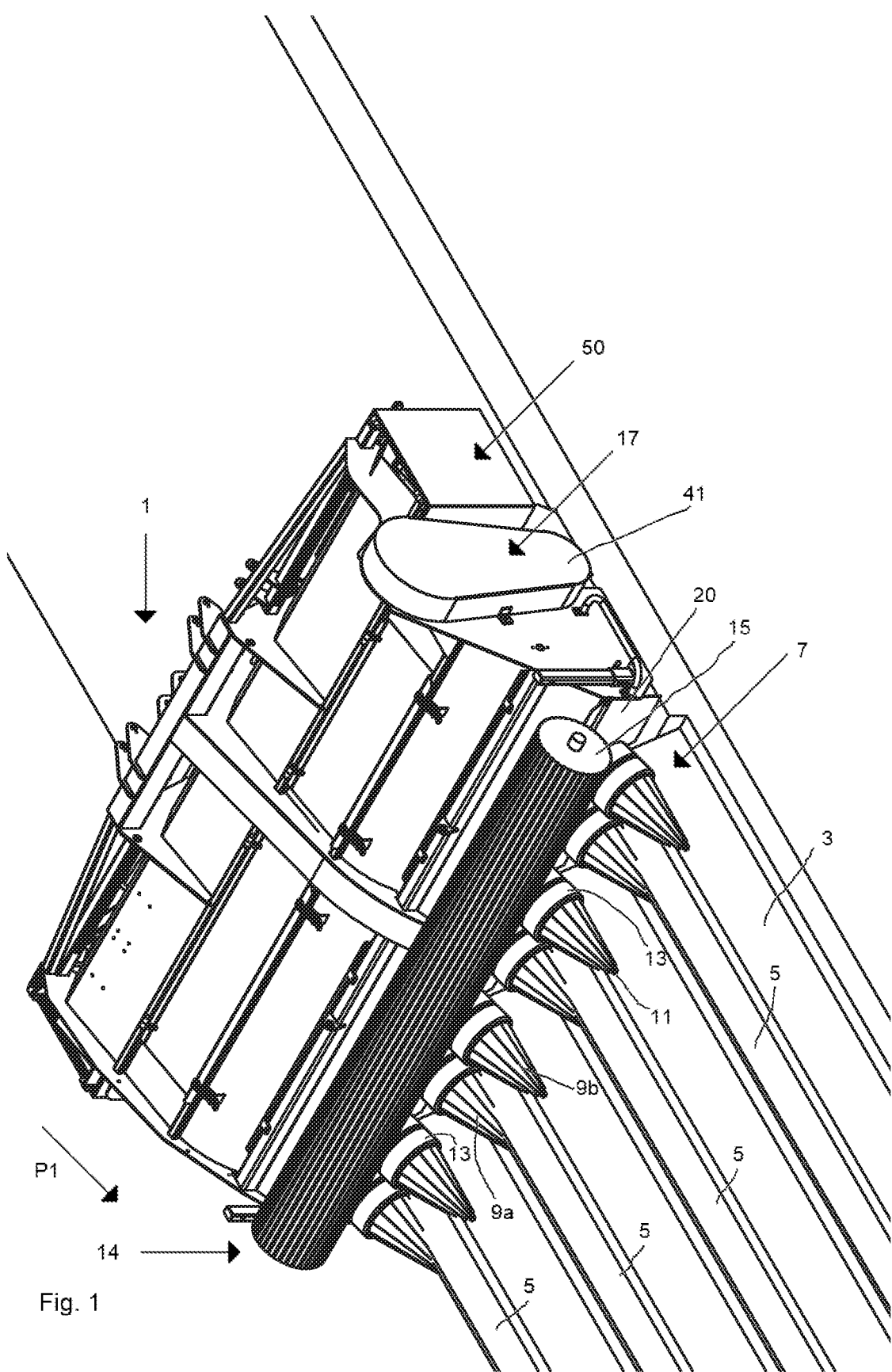

FOLIAGE-PROCESSING DEVICE AND HARVESTING MACHINE COMPRISING SUCH A FOLIAGE-PROCESSING DEVICE

CROSS-REFERENCE TO RELATED APPLICATION

This application is a national stage of Application No. PCT/NL2017/050475 filed Jul. 13, 2017, which claims priority from Netherlands Application No. 2017172 filed Jul. 15, 2016, which are both incorporated by reference in their entireties.

The invention relates to a foliage-processing device which can be moved across agricultural land in a direction of travel for foliage of tuberous plants growing in rows on agricultural land.

It is known to remove foliage using a foliage puller, but a drawback of the known foliage pullers is that they remove the pulled-off foliage in such a way that the foliage of the tuberous plants has to be separated from the tubers in an additional operation prior to or during harvesting of the tubers.

An example of such a foliage puller is described, for example, in NL8103511. The foliage puller disclosed herein comprises a spiral elevator which is disposed above the rollers and by means of which the foliage is moved back to the potato ridge so that the foliage forms a protective layer for the potatoes situated in the ridge, so that the potatoes can be harvested at a later point in time. The ridges form the rows in which the potatoes grow.

The foliage puller described in NL8103511 thus also has the drawback that the tubers and the foliage have to be separated from one another in an additional, separate operation.

It is an object of the invention to provide a foliage-processing device by means of which the row or ridge in which the tuberous plants grow can be cleared or virtually cleared of foliage by means of a single device which can be moved across agricultural land.

This object is achieved by the foliage-processing device according to claim 1.

The foliage-processing device is provided with a foliage puller and with a foliage-processing mechanism by means of which the foliage pulled off by the foliage puller can be removed next to a row or between the rows of tuberous plants growing on agricultural land. In this way, every row of the agricultural land can be cleared of foliage, including pulled-off foliage, in a single operation by moving the foliage-processing device over the row or rows. By means of the foliage-processing device, the row to be harvested is virtually free from foliage, as a result of which the amount of foliage in a harvesting machine is minimal, so that the soil can be sifted from between the tubers simply, quickly and better in the harvesting machine, as a result of which the harvesting capacity can be greatly increased.

In the foliage puller, the foliage is moved in a direction facing away from the agricultural land by means of the rollers. For a more effective removal of foliage from the foliage puller, at least one elongate guide roller may be provided, the rotation axle of which extends substantially along the width of the foliage-processing device. The guide roller may, at least partly, be arranged above the rollers of the foliage puller in order to move the pulled-off foliage which can be moved by means of the rollers back to the agricultural land in a direction facing away from the agricultural land for further processing by means of the foliage-processing mechanism which is arranged behind the latter, at a distance from the rollers. The foliage-processing mechanism may comprise a haulm topper, a reaper and/or a shredder mechanism, wherein the foliage cut off by means of the foliage-processing mechanism, optionally shredded by means of the foliage-processing mechanism, is moved laterally with respect to the direction of travel by blades and the air currents resulting therefrom to a position between the rows/ridges of tuberous plants. To this end, the blades may be designed in such a way that the product they cut is moved substantially laterally. Guiding the loose foliage in a lateral direction with respect to the direction of travel to a position next to or between the rows may be promoted and streamlined further by guide baffles. By removing the foliage between the rows, pick-up of foliage during harvesting is greatly reduced, which results in a reduction in or even the elimination of obstructions, and leads to a cleaner product and a higher harvesting capacity. In addition, the double treatment involving a foliage puller and a foliage-processing mechanism ensures that the use of chemical pesticides can be omitted, the use of which not only has adverse effects on the environment, but also necessitates labour-intensive operations, such as the accurate metering and spraying of the pesticide. By means of the foliage-processing device according to the present invention, harvesting operations can be carried out in a more environmentally friendly and smooth way and the harvesting capacity can be greatly increased.

The foliage-processing mechanism may comprise two oppositely rotatable transport rollers which are arranged above the rollers of the foliage puller, wherein each transport roller has the same direction of rotation as the roller of the foliage puller situated underneath, by means of which the foliage pulled off by means of the foliage remover can be removed next to a row or between the rows of tuberous plants growing on agricultural land.

Figure 2A:
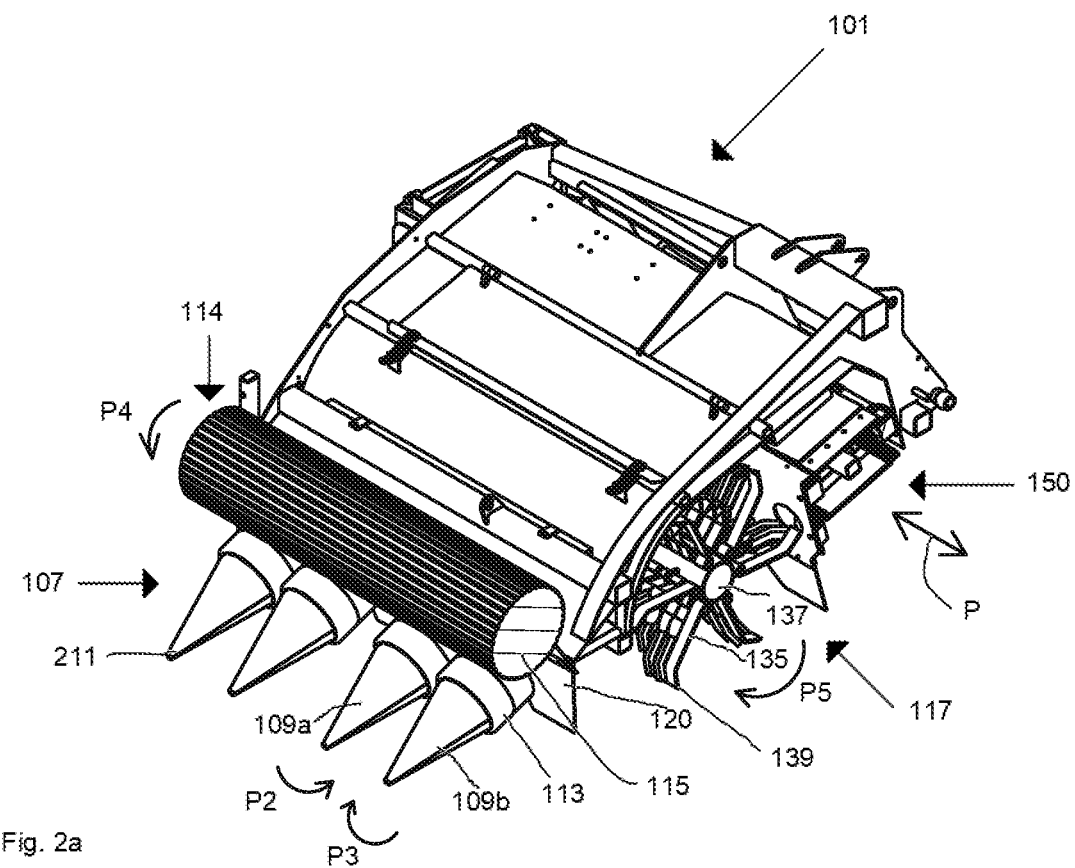
Figure 3B:
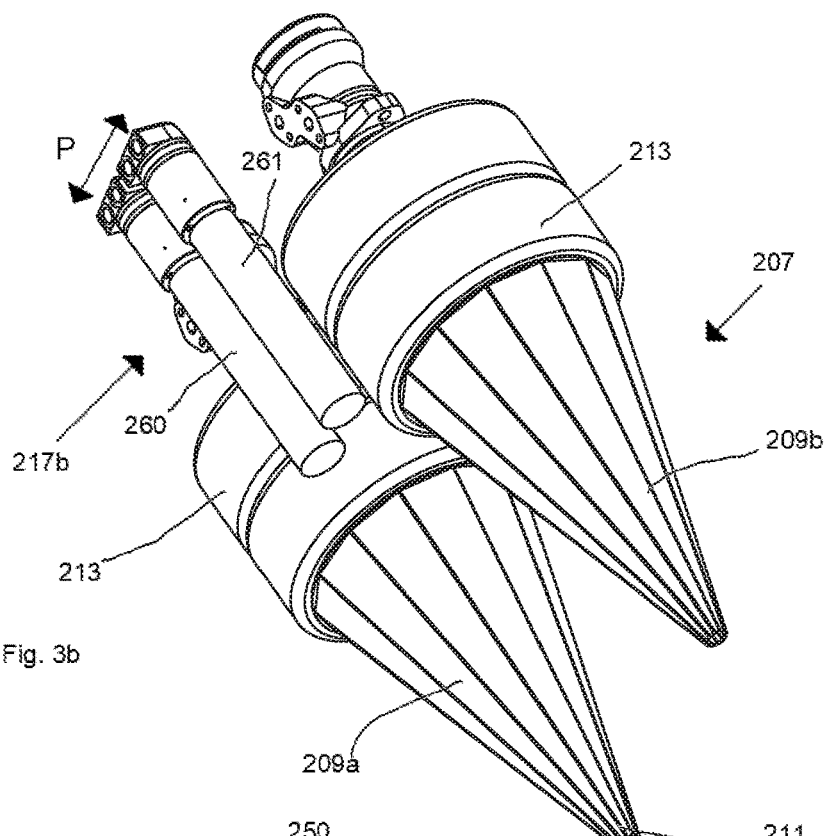
Figure 3A:
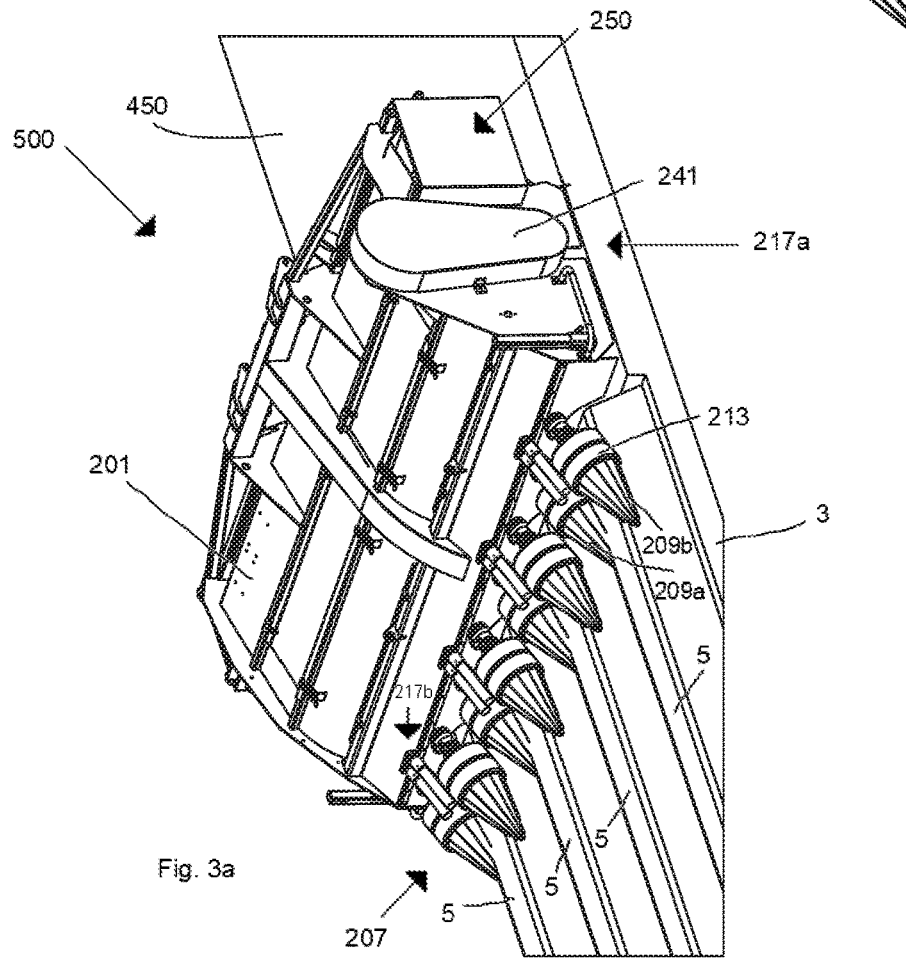
Figure 4A:
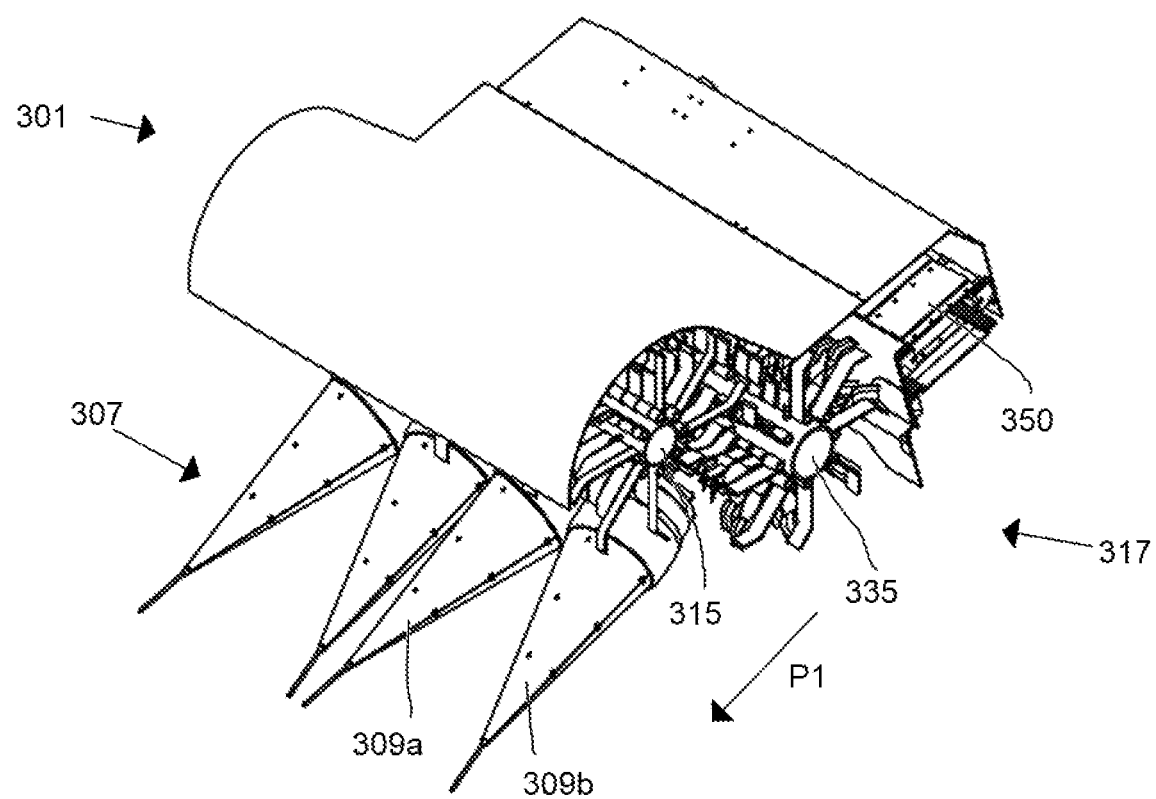
Figure 5A:
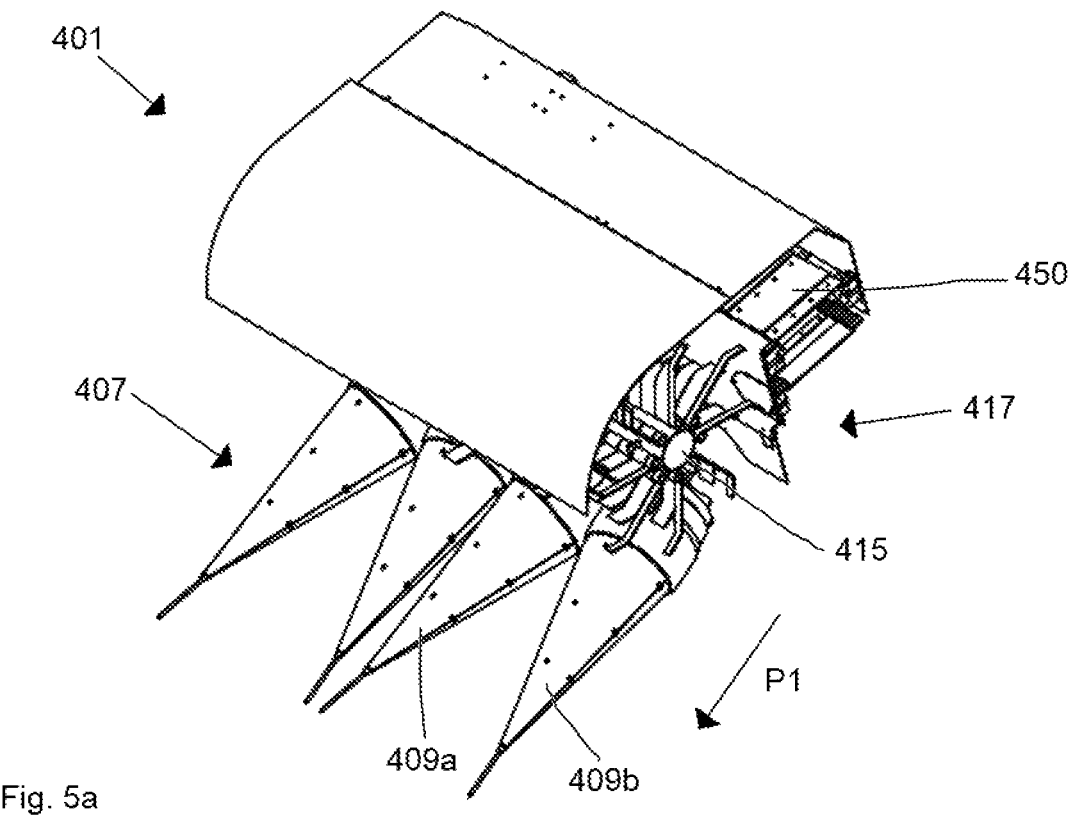

The foliage-processing device will now be explained in more detail by means of exemplary embodiments which are shown in the figures, in which:

FIG. 1 shows a perspective view of a foliage-processing device for simultaneously treating at most four rows;

FIGS. 2a,b show a cut-away perspective view and a cross section of a foliage-processing device for simultaneously treating at most two rows;

FIGS. 3a,b show parts of a harvesting machine comprising an alternative foliage-processing device for simultaneously treating at most four rows;

FIGS. 4a,b show a cut-away perspective view and a cross section of a further foliage-processing device for simultaneously treating at most two rows;

FIGS. 5a,b show a cut-away perspective view and a cross section of a further foliage-processing device for simultaneously treating at most two rows.

In the figures, similar parts are denoted by the same reference numerals.

Figure 2B:
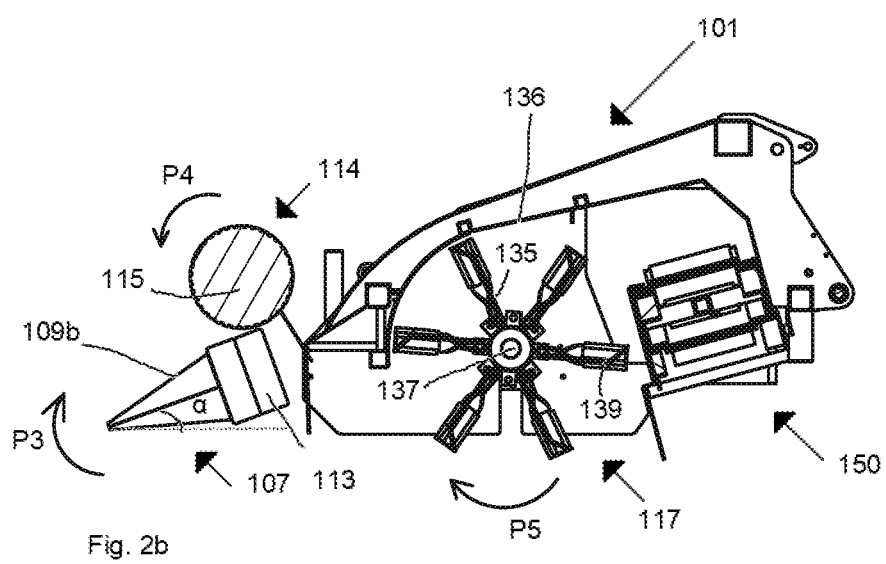

FIGS. 1, 2a,2b show a foliage-processing device 1; 101 which can be moved across agricultural land 3 in a direction of travel P1. By means of the foliage-processing device 1; 101, foliage (not shown) of tuberous plants growing in rows 5 (or ridges) is treated, so that tubers of the tuberous plant can be harvested more easily and efficiently by means of a harvesting machine. The foliage-processing device 1; 101 may be in the form of a self-propelled embodiment or a pulled embodiment, so that it can be pulled across agricultural land by means of an agricultural vehicle (not shown). FIG. 3a partly shows a self-propelled harvesting machine 500 in which an alternative foliage-processing device 201 is provided which is incorporated in a diagrammatically illustrated harvester 450. FIG. 3b shows an enlarged view of the foliage puller 207 and of a part 217b of the foliage-processing mechanism of the alternative foliage-processing device 201. The action of the foliage pullers 7; 107; 207 is virtually identical and will be described briefly below.

The foliage pullers 7; 207 comprise four pairs of rollers 9a, 9b; 209a, 209b in the foliage-processing device 1; 201, while the foliage puller 107 comprises two pairs of rollers 109a, 109b in the foliage-processing device 101. The two rollers 9a, 9b; 109a, 109b; 209a, 209b of each pair are of identical design, with each roller being conical. The belts (tyres or tyre-shaped rings) 13; 113; 213 attached to the rollers may be attached in such a manner with respect to each other that they only contact each other to a minimum degree. The rollers rotate in opposite directions to each other, as is represented in FIG. 2a by the arrows P2 and P3. The foliage of the tuberous plants is clamped between the oppositely rotating rollers, in particular the belts 13; 113; 213 thereof, and a short upward tug is exerted on the clamped foliage due to the opposite direction of rotation, as a result of which the foliage is pulled off the tuber (not shown) which is fixed underground in row 5. To ensure correct insertion of the foliage, the rollers are of conical design and provided with a cone-shaped tip 11; 111; 211. The cone-shaped tip 11; 111; 211 forms the end of every roller with the smallest diameter. The cone-shaped tips 11; 111; 211 form the foremost part of the foliage-processing device 1; 101; 201. The mutually contacting belts 13, 113, 213 are attached near the end of the rollers situated opposite the cone-shaped tips 11; 111; 211. The belts may be designed to be elastic, so that pebbles and the like which are carried along can pass the mutually contacting belts 13, 113, 213 without damaging them.

The rotation axles of the rollers 9a, 9b; 109a, 109b; 209a, 209b extend substantially in the direction of travel, the rotation axles of the rollers furthermore enclosing an acute angle α with the horizontal h, the angle α being between 0 and 45 degrees. Such an angle α of the rollers assists the separation of the foliage from the tuber, because, due to the angle α, the pulling direction used to separate the foliage from the tuber does not only have a vertical component, but also comprises a horizontal component. By means of an adjustment mechanism (not shown), it is possible to adjust the angle, depending on the circumstances.

The foliage-processing device 1, 101 illustrated in FIGS. 1, 2a,2b is provided with a guide mechanism 14; 114 which is arranged near the rollers of the foliage puller to move the pulled-off foliage which can be moved by means of the rollers back to the agricultural land in a direction facing away from the agricultural land for further processing by means of the foliage-processing mechanism 17, 117. The elongate guide mechanism 14; 114 is a guide roller 15, 115 rotatable in the direction indicated by arrow P4, whose rotation axle 16 extends in the width direction of the foliage-processing device 1, 101. The guide roller 15; 115 extends over virtually the entire width of the foliage-processing device 1; 101. Near and around the guide roller 15; 115, plates 20; 120 are provided for guiding the foliage back to the agricultural land, so that the foliage-processing mechanism 17, 117, which is arranged at a distance behind the guide roller 15; 115 and the foliage puller 7; 107 can perform the subsequent treatment of the foliage.

The length of the illustrated foliage-processing device 1; 101: 201 extends in the direction of travel of the foliage-processing device 1; 101: 201 and its width extends at right angles to the length direction, with the height of the illustrated foliage-processing device 1; 101: 201 extending vertically upwards from the agricultural land 3.

The foliage-processing mechanism 17; 117; 217a, 217b picks up foliage pulled off by means of the foliage puller from the agricultural land 5 and removes the pulled-off foliage to an outer row 3 or removes the foliage to a position situated between the rows 3.

The foliage-processing mechanism 117 comprises a haulm topper 135 and guide baffles 136. The foliage-processing mechanism 117 therefore performs an additional mechanical foliage-destroying operation by using a haulm topper 135. The haulm topper 135 comprises a quickly rotating axle 137 with a number of clappers (blades) 139. The quickly rotating axle rotates in the direction indicated by arrow P5. The foliage cut off by means of the haulm topper 135 and the foliage which has already been pulled off by the foliage puller can be moved laterally, in the directions indicated by the double arrow P at right angles to the direction of travel, by means of the blades 139 and the guide baffles 136 and by means of the air currents generated by the rotating blades 139. Together with the high suction capacity and by using a counter-blade, the foliage lying on the ground can even be crushed and removed by means of the haulm topper 135. The foliage-processing mechanism 17; 117; 217b is provided with an end guide baffle 41, 241, which the foliage which is being moved laterally by the blades and/or the generated air currents hits before then dropping between the rows/ridges of tubers via an outlet on account of the force of gravity. The illustrated foliage-processing device 1, 101, 201 furthermore comprises an (optional) conveyor belt 50, 150, 250 for laterally removing the foliage which has been tossed in the air. By moving the foliage between the rows, pick-up of foliage during harvesting is greatly reduced, thus resulting in a reduction in or even the elimination of obstructions, and leads to a cleaner product and a higher harvesting capacity.

The foliage-processing device 201 illustrated in FIG. 3a, 3b comprises an alternative embodiment of the foliage-processing mechanism 217b instead of the guide roller 15, 115. This foliage-processing mechanism 217b comprises two oppositely rotatable transport rollers 260, 261, which may contact each other to a minimal degree. Preferably, the transport rollers 260, 261 as well as the belts (tyres or tyre-shaped rings) 213 are elastic in order to increase their service life. The transport rollers 260, 261 are arranged above the rollers 209a, 209b of the foliage puller, more particularly above the belts 213 which are partly attached to the rollers. The rollers 209a, 209b rotate in the same direction as the rollers 109a, 109b, indicated in FIG. 2a by arrows P2 and P3. Every transport roller 260, 261 rotates in the same direction of rotation as the roller 209a, 209b of the foliage puller 209 situated underneath. The distance between the belts 213 which clamp the foliage and the transport rollers 260, 261 is smaller than the diameter of the belts 213. After the foliage has been broken off in the nip between the belts by the short mechanical tug, the pulled-off foliage is moved by means of the rotating rollers 209a, 209b in a direction facing away from the agricultural land, as a result of which the pulled-off foliage is guided between the transport rollers 260, 261 which guide the foliage further upward and laterally in the direction indicated by the double arrow P, as a result of which the foliage is removed in the desired direction in order to be deposited between the rows. The foliage-processing mechanism 217a may work autonomously and independently from the foliage-processing mechanism 217b. In such an embodiment (not shown in the figures), the foliage-processing mechanism 217a may therefore be absent, wherein, for this embodiment, even the direction of travel may be in or counter to the direction indicated by arrow P1. The foliage-processing mechanism 217b may also be provided with guide baffles (not shown) which are situated at least partly around the transport rollers for laterally removing the pulled-off foliage to a position next to a row or to a position between the rows.

The foliage-processing mechanism may be provided with at least one reaper with a rotation axle extending in the height direction of the foliage-processing device instead of with a haulm topper. A reaper may for example be desired or suitable instead of a haulm topper if the tuberous plants arranged in rows grow on relatively flat agricultural land without any ridges (and troughs). The blades of the reaper may be designed in such a manner that cut-off foliage is moved substantially laterally during operation and/or an air current may be generated by means of the blades, as a result of which the foliage cut off by the blades and/or the foliage pulled off by the foliage puller is moved sideways.

The foliage-processing mechanism may also comprise a shredder mechanism.

FIGS. 4a,b and 5a,b diagrammatically show a further foliage-processing device 301; 401 which can be moved across agricultural land in a direction of travel P1 for foliage of tuberous plants growing in rows on the agricultural land. The foliage-processing device 301; 401 is provided with:
- a foliage puller 307; 407 which is provided with a number of pairs of mutually oppositely rotating rollers 309a, 309b; 409a, 409b between which foliage can be clamped and pulled off;
- a foliage-processing mechanism 317; 417 by means of which the foliage pulled off by means of the foliage puller 307; 407 can be removed next to a row or between the rows of tuberous plants growing on the agricultural land.

Figure 4B:
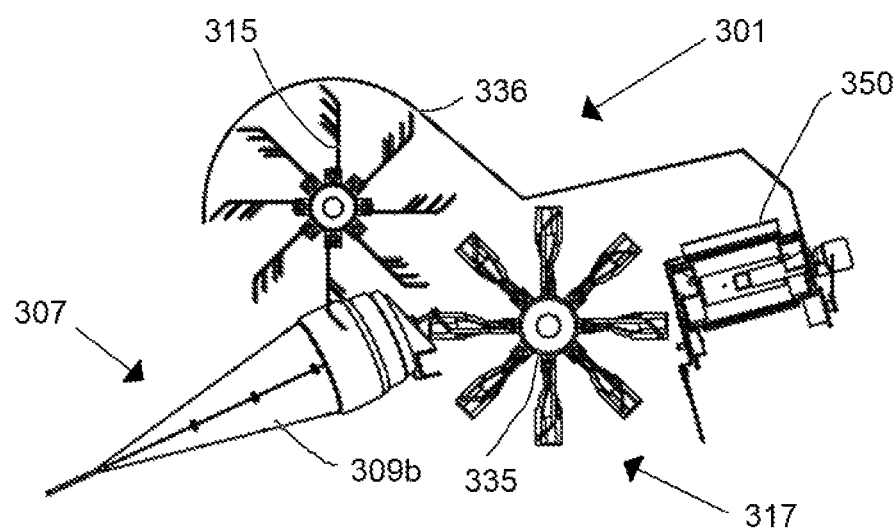

In the foliage-processing device 301; 401 illustrated in FIGS. 4a,4b; 5a,5b, the foliage pullers 307; 407 are of virtually identical design.

In the foliage-processing device 301; 401 illustrated in FIGS. 4a,4b; 5a,5b, the foliage-processing mechanisms 317; 417 are of a different design.

Furthermore, the foliage-processing device 301; 401 comprises a haulm topper 315; 415 which rotates around a rotation axle which extends substantially in the width direction (see the direction indicated by arrow P in, for example, FIG. 2a) of the foliage-processing device 301; 401. By means of this haulm topper 315; 415, an additional mechanical foliage-destroying operation can be performed on the foliage which has been pulled off by means of the rollers 309a, 309b; 409a, 409b.

The haulm topper 315 may furthermore be designed as a guide mechanism which is arranged near the rollers of the foliage puller.

The haulm topper 315 designed as a guide mechanism is arranged above the rollers 309a, 309b in such a way that it is possible, by means of the blades of the haulm topper 315, to move pulled-off foliage back to the agricultural land by means of the rollers 309a, 309b for further treatment by the foliage-processing mechanism 317 situated downstream thereof.

However, the haulm topper 315 may also be designed as a foliage-processing mechanism which is able to operate independently from the downstream foliage-processing mechanism 317, that is to say it is even possible to design the foliage-processing device 301 without a foliage-processing mechanism 317, if the haulm topper 315 is designed as a foliage-processing mechanism by means of which foliage pulled off using the rollers 309a, 309b can be treated directly. Treating foliage directly by means of the haulm topper 315 arranged above the rollers 309a, 309b is understood to mean that, during operation, due to the construction of the haulm topper 315 and/or due to the design of the blades of the haulm topper, foliage pulled off using the rollers 309a, 309b can be removed next to a row or between the rows of tuberous plants growing on the agricultural land and/or foliage pulled off using the rollers 309a, 309b can be removed next to a row or between the rows of tuberous plants growing on the agricultural land via air currents which can be generated by means of the haulm topper 315 and/or foliage pulled off using the rollers 309a, 309b can be removed next to a row or between the rows of tuberous plants growing on the agricultural land by the combination of the haulm topper 315 and guide baffles (not shown).

The foliage-processing device 301 illustrated in FIGS. 4a,b furthermore comprises a foliage-processing mechanism 317 comprising a second haulm topper 335, a guide baffle 336, optionally end guide baffles (not shown) and a conveyor belt 350. In terms of operation, the foliage-processing mechanism 317 corresponds to the foliage-processing mechanism 117 illustrated in FIGS. 2a,b, so that reference should be made to the corresponding description above.

In terms of construction, the foliage-processing device 401 illustrated in FIGS. 4a,b is virtually identical to the foliage-processing device 301 illustrated in FIGS. 3a,b, except that the second haulm topper 335 has been omitted in the foliage-processing device 401 illustrated in FIGS. 4a,b.

The foliage-processing mechanism 417 of the foliage-processing device 401 comprises the haulm topper 415, the guide baffles 436 and a conveyor belt 450. It is not possible to move the foliage back to the agricultural land using the haulm topper 415, since the foliage-processing device 401 has no means for further treatment by means of the downstream foliage-processing mechanism 417 for the foliage situated on the agricultural land.

The haulm topper 415 is arranged near and above the rollers of the foliage puller in such a way that it is possible to treat foliage pulled off using the rollers 409a, 409b directly by means of the blades of the haulm topper 415.

Treating foliage directly by means of the haulm topper 415 is understood to mean that, during operation, due to the construction of the haulm topper 415 and due to the design of the blades of the haulm topper 415, foliage pulled off using the rollers 409a, 409b can be removed next to a row or between the rows of tuberous plants growing on the agricultural land and/or foliage pulled off using the rollers 409a, 409b can be removed next to a row or between the rows of tuberous plants growing on the agricultural land via air currents which can be generated by means of the haulm topper 415 and/or foliage pulled off using the rollers 409a, 409b can be removed next to a row or between the rows of tuberous plants growing on the agricultural land by the combination of the haulm topper 415 and guide baffles (not shown).

Figure 5B:
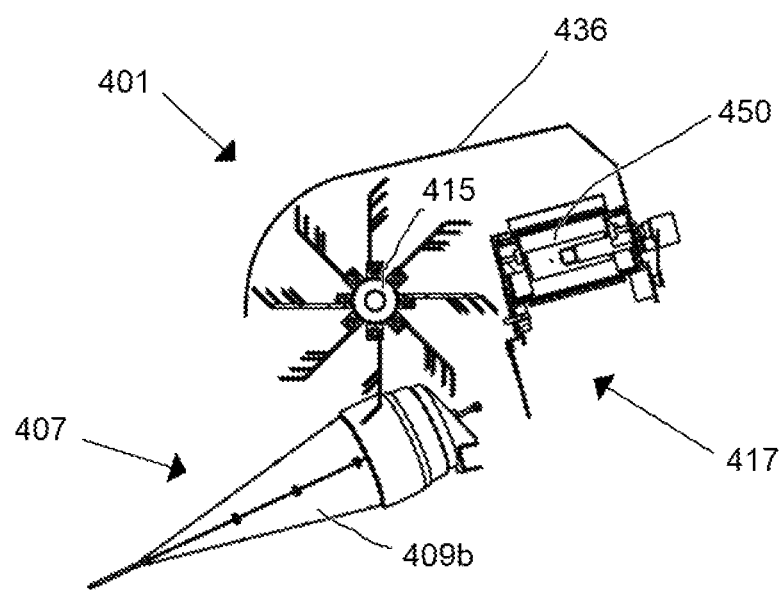

In the embodiment of the foliage-processing device 401 illustrated in FIGS. 5a, 5b, at least some of the foliage is moved upwards and rearwards, in the direction of the conveyor belt 450 by means of the haulm topper 415. In this case, guide baffles 436 ensure that this foliage is guided to the conveyor belt 450, in which case the foliage pulled off by the foliage puller can be removed next to a row or between the rows of tuberous plants growing on the agricultural land by means of the conveyor belt 450.

It is even possible for the haulm topper 415 to be constructed in such a way that the foliage pulled off using the rollers 409a, 409b is moved virtually completely upwards and rearwards in the direction of the conveyor belt 450 by the haulm topper 415, that is to say that the haulm topper 415 is constructed in such a way that the foliage pulled off using the rollers 409a, 409b cannot or hardly at all be removed next to a row or between the rows of tuberous plants growing on the agricultural land by means of the haulm topper 415, but the foliage pulled off using the foliage puller can be removed next to a row or between the rows of tuberous plants growing on the agricultural land by means of the conveyor belt 450.

The invention claimed is:

1. A foliage-processing device which can be moved across agricultural land in a direction of travel for foliage of tuberous plants growing in rows on agricultural land, the foliage-processing device comprising:
    a foliage puller which is provided with at least two mutually oppositely rotating rollers between which foliage can be clamped and pulled off; and
    guide baffles configured to guide foliage to a conveyor belt wherein the foliage pulled off by the foliage puller is removed next to a row or between the rows of tuberous plants growing on the agricultural land via the conveyor belt.

2. The foliage-processing device according to claim 1, wherein the conveyor belt is arranged behind the foliage puller, at a distance therefrom.

3. The foliage-processing device according to claim 1, wherein the foliage-processing device further includes a guide mechanism arranged near the rollers of the foliage puller, the guide mechanism assisting in moving the pulled-off foliage via the rollers back to the agricultural land for further processing by the foliage-processing device.

4. The foliage-processing device according to claim 3, wherein the guide mechanism comprises a guide roller, the rotation axle of which extends along the width of the foliage-processing device.

5. The foliage-processing device according to claim 1, wherein the rollers of the foliage puller are conical and partly elastic, each of the conical rollers has ends with varying diameters, wherein the ends of the conical rollers with a smallest diameter form the foremost part of the foliage-processing device.

6. The foliage-processing device according to claim 1, wherein the rotation axles of the rollers extend substantially in the direction of travel, wherein the rotation axles of the rollers enclose an acute angle with the horizontal.

7. The foliage-processing device according to claim 1 further including a haulm topper with a rotation axle extending in the width direction of the foliage-processing device, the haulm topper extending virtually across the width of the foliage-processing device.

8. The foliage-processing device according to claim 1, wherein the foliage-processing device comprises two oppositely rotatable transport rollers which are arranged above the rollers of the foliage puller, wherein each transport roller has the same direction of rotation as the roller of the foliage puller situated underneath.

9. The foliage-processing device according to claim 8, wherein the foliage-processing device is provided with guide baffles which are situated at least partly around the transport rollers to remove the pulled-off foliage to a position next to a row or to a position between the rows of tuberous plants growing on the agricultural land.

10. The foliage-processing device according to claim 1, wherein more than one row of the tuberous plants growing on the agricultural land can be treated simultaneously by means of the foliage-processing device.

11. A harvesting machine comprising a foliage-processing device according to claim 1.

12. The harvesting machine according to claim 11, wherein the harvesting machine is self-propelled.

13. A foliage-processing device that can be moved across agricultural land in a direction of travel for foliage of tuberous plants growing in rows on the agricultural land, the foliage-processing device comprising:
    a foliage puller including at least two mutually oppositely rotating rollers between which foliage can be clamped and pulled off;
    a foliage-processing mechanism configured to remove the pulled off foliage from the foliage puller, the foliage being removed next to a row or between the rows of tuberous plants growing on the agricultural land; and
    a guide roller arranged near the oppositely rotating rollers of the foliage puller, the guide roller assisting in moving the pulled-off foliage via the oppositely rotating rollers back to the agricultural land for further processing by the foliage-processing device, a rotation axle of the guide roller extending along a width of the foliage-processing device.

14. The foliage-processing device according to claim 13, wherein the rollers of the foliage puller are conical and partly elastic, each of the conical rollers has ends with varying diameters, wherein the ends of the conical rollers with a smallest diameter form the foremost part of the foliage-processing device.

15. The foliage-processing device according to claim 13, wherein the rotation axles of the oppositely rotating rollers extend substantially in the direction of travel, the rotation axles of the rollers enclosing an acute angle with the horizontal.

16. The foliage-processing device according to claim 13, wherein the foliage-processing mechanism further performs a mechanical foliage-destroying operation by using at least one blade.

17. A foliage-processing device that can be moved across agricultural land in a direction of travel for foliage of tuberous plants growing in rows on the agricultural land, the foliage-processing device comprising:
    a foliage puller including at least two mutually oppositely rotating rollers between which foliage can be clamped and pulled off;
    a foliage-processing mechanism configured to remove the pulled off foliage from the foliage puller, the foliage being removed next to a row or between the rows of tuberous plants growing on the agricultural land; and
    a haulm topper with a rotation axle extending in a width direction of the foliage-processing device, the haulm topper extending virtually across the width direction of the foliage-processing device.

* * * * *